(12) United States Patent
Lin (10) Patent No.: US 8,363,131 B2
(45) Date of Patent: Jan. 29, 2013

(54) APPARATUS AND METHOD FOR LOCAL CONTRAST ENHANCED TONE MAPPING

(75) Inventor: Sheng Lin, San Jose, CA (US)

(73) Assignee: Aptina Imaging Corporation, George Town (KY)

(*) Notice: Subject to any disclaimer, the term of this patent is extended or adjusted under 35 U.S.C. 154(b) by 581 days.

(21) Appl. No.: 12/354,328

(22) Filed: Jan. 15, 2009

(65) Prior Publication Data

US 2010/0177203 A1    Jul. 15, 2010

(51) Int. Cl.
*H04N 5/20* (2006.01)
*G06K 9/40* (2006.01)

(52) U.S. Cl. ......................... 348/255; 382/274

(58) Field of Classification Search .......................... None
See application file for complete search history.

(56) References Cited

U.S. PATENT DOCUMENTS

| | | | |
|---|---|---|---|
| 6,580,825 B2 | 6/2003 | Bhaskar | |
| 6,850,642 B1 | 2/2005 | Wang | |
| 7,013,044 B2 | 3/2006 | Wang | |
| 7,023,580 B2 | 4/2006 | Zhang et al. | |
| 8,041,144 B2 * | 10/2011 | Kim et al. ...................... | 382/274 |
| 2001/0040979 A1 * | 11/2001 | Davidson et al. ............. | 382/100 |
| 2005/0163393 A1 | 7/2005 | Asari | |
| 2005/0185069 A1 * | 8/2005 | Sim et al. ....................... | 348/239 |
| 2005/0226526 A1 * | 10/2005 | Mitsunaga .................... | 382/274 |
| 2006/0062562 A1 * | 3/2006 | Utagawa ........................ | 396/213 |
| 2007/0009167 A1 * | 1/2007 | Dance et al. .................. | 382/254 |
| 2007/0127095 A1 * | 6/2007 | Sugimori ....................... | 358/520 |
| 2007/0188785 A1 * | 8/2007 | Shinbata ........................ | 358/1.9 |
| 2007/0269132 A1 * | 11/2007 | Duan et al. .................... | 382/274 |
| 2008/0043262 A1 | 2/2008 | Ovsiannikov | |
| 2008/0107360 A1 * | 5/2008 | Yamashita et al. ............ | 382/313 |
| 2009/0041376 A1 * | 2/2009 | Carletta et al. ................ | 382/274 |
| 2009/0060367 A1 * | 3/2009 | Wei ................................ | 382/260 |
| 2009/0174797 A1 * | 7/2009 | Hu et al. ........................ | 348/247 |
| 2010/0074553 A1 * | 3/2010 | Choi et al. ..................... | 382/274 |

OTHER PUBLICATIONS

Contrast Restoration by Adaptive Countershading, Grzegorz Krawczyk, Karol Myszkowski, Hans-Peter Seidel; The Eurographics Association and Blackwell Publishing, vol. 26, Publication Date 2007.

* cited by examiner

*Primary Examiner* — Albert Cutler (57) ABSTRACT

Methods and systems for enhancing an image. Respective local contrast values are determined for selected pixels of the image by, for each selected pixel, adjusting a respective luminance value of the pixel by an average luminance value of neighboring pixels to obtain the local contrast value. Respective tone-mapped values are determined for further selected pixels in the image based on a global luminance value representing the image. The local contrast values and the tone-mapped values are combined, respectively, for the corresponding pixels in the image to produce the enhanced image.

25 Claims, 7 Drawing Sheets

| | 1 | 2 | 3 | 4 | 5 | 6 | 7 | 8 |
|---|---|---|---|---|---|---|---|---|
| 1 | G | R | G | R | G | R | G | R |
| 2 | B | G | B | G | B | G | B | G |
| 3 | G | R | G | R | G | R | G | R |
| 4 | B | G | B | G | B | G | B | G |
| 5 | G | R | G | R | G | R | G | R |
| 6 | B | G | B | G | B | G | B | G |

FIG. 5

APPARATUS AND METHOD FOR LOCAL CONTRAST ENHANCED TONE MAPPING

The present invention relates to CMOS imagers and, more particularly, to methods and systems for forming compressed images with local contrast enhancement.

BACKGROUND

Color digital imaging systems, such as digital cameras, typically employ image sensors, such as charge coupled devices (CCDs) or complementary metal oxide semiconductor (CMOS) devices to digitally capture a scene of interest. Image sensors typically include an array of optical detectors, such as photodiodes, that generate an electrical response in proportion to the intensity of incident light. The dynamic range of individual optical detectors is defined by the minimum amount of light that is required to generate an electrical response at the low end and the maximum amount of light beyond which the electrical response of the optical detector does not change (i.e. a saturation point) at the high end.

There is a trend toward developing imaging systems to produce high dynamic range (HDR) images. Output devices (e.g., display devices or printers) for presenting HDR images, however, typically have a more limited dynamic range. Accordingly, there is a need for techniques to compress the dynamic range of an image to correspond to the dynamic range of the output device. One such technique for dynamic range compression includes tone mapping. Tone mapping, in general, maps captured scene luminance levels of an HDR image to the luminance or density levels of the output device.

Tone mapping is typically categorized as relating to global tone mapping techniques or local tone mapping techniques. Global tone mapping is generally based on a global luminance adaptation of the HDR image, whereas local tone mapping is based on a local luminance level adaptation of the HDR image. Accordingly, global tone mapping techniques are generally less computationally intensive than local tone mapping techniques. An objective of tone mapping (both global and local tone mapping) is to provide an output image with a lower dynamic range, while attempting to preserve the image detail and color appearance of the originally captured image. Because tone mapping reduces the dynamic range and, thus, the contrast of the HDR image, the compressed image may still appear flat and dull. The compressed image may also include a subjectively unpleasing loss of detail as compared with the original HDR image.

DETAILED DESCRIPTION

Figure 1A:
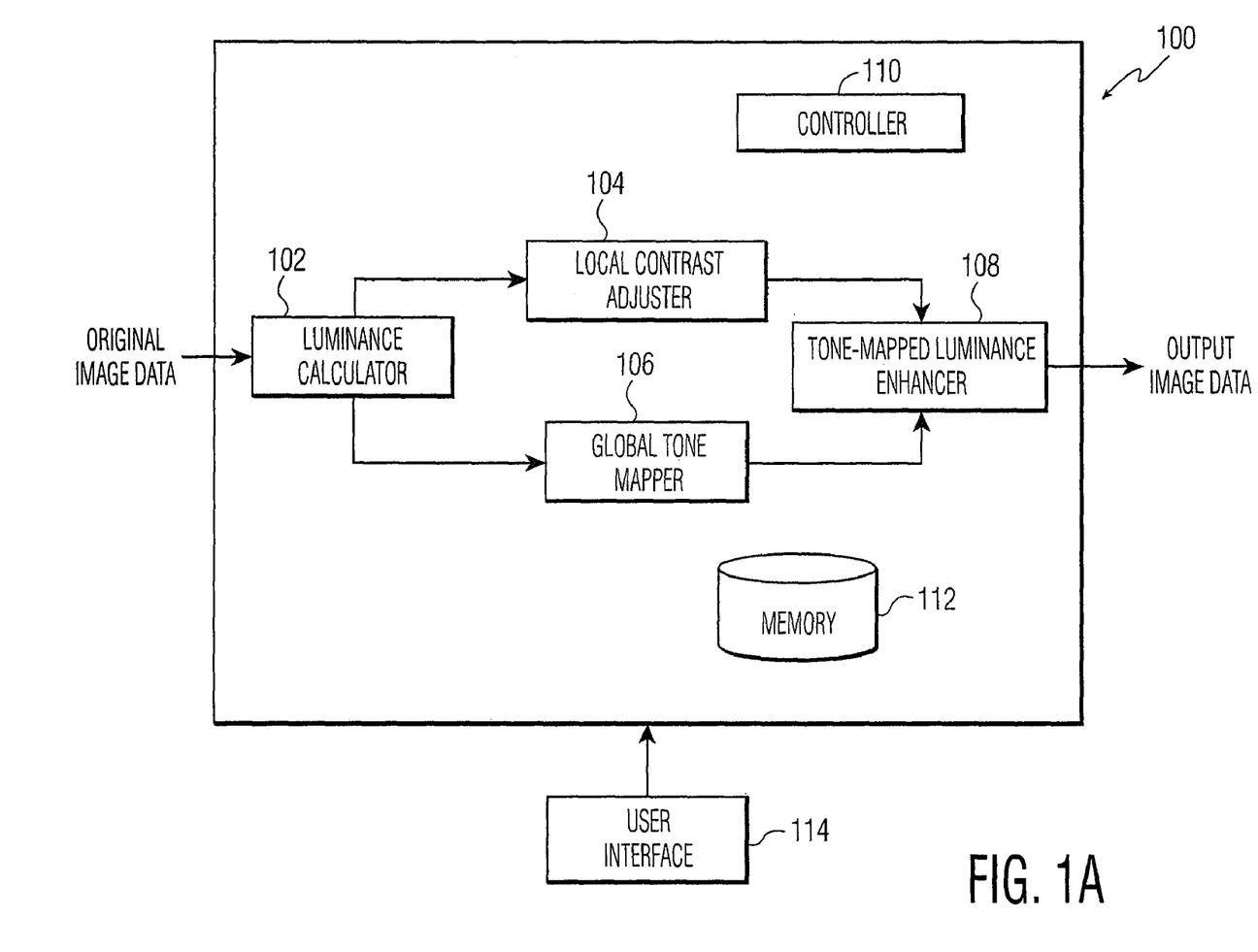
FIGS. 1A and 1B are block diagrams illustrating local contrast-global tone mapping (LC-GTM) systems according to example embodiments of the invention.

FIG. 1A is a block diagram of an example local contrast-global tone mapping (LC-GTM) system, designated generally as 100. LC-GTM system 100 includes luminance calculator 102, local contrast adjuster 104, global tone mapper 106, tone-mapped luminance enhancer 108 and controller 110. LC-GTM system 100 may use software or dedicated hardware to generate a compressed image with local contrast enhancement. In general, LC-GTM system 100 receives original image data, for example, from an imaging array 406 (FIG. 4A) and generates output image data (i.e. a compressed image). The output image data may be stored in memory 112.

Controller 110 can control luminance calculator 102, local contrast adjuster 104, global tone mapper 106 and tone-mapped luminance enhancer 108 for generating the output image data. Controller 110 may also receive information, for example, from user interface 114, to adjust one or more settings of luminance calculator 102, local contrast adjuster 104, global tone mapper 106 and tone-mapped luminance enhancer 108. In addition, controller 110 may perform at least some of the functions of one or more of the luminance calculator 102, local contrast adjuster 104, global tone mapper 106 and tone-mapped luminance enhancer 108.

Luminance calculator 102 receives the original image data and determines a luminance value for each pixel of the original image data. In particular, luminance calculator 102 receives red (R), green (G) and blue (B) pixel signals for corresponding color channels of a pixel at location(x,y) (also referred to herein as pixel(x,y)) in the original image data. Luminance calculator 102 converts the pixel signals to a luminance value (L) based on the specific type of color space used. For example, the luminance value L for pixel (x,y) for sRGB space is shown in Eq. (1) as:

$$L(x,y)=0.2125*R(x,y)+0.7154*G(x,y)+0.0721*B(x,y) \quad (1)$$

It is understood that Eq. (1) represents an example luminance conversion relationship and that any suitable luminance conversion relationship may be used based on the type of color space.

Figure 1B:
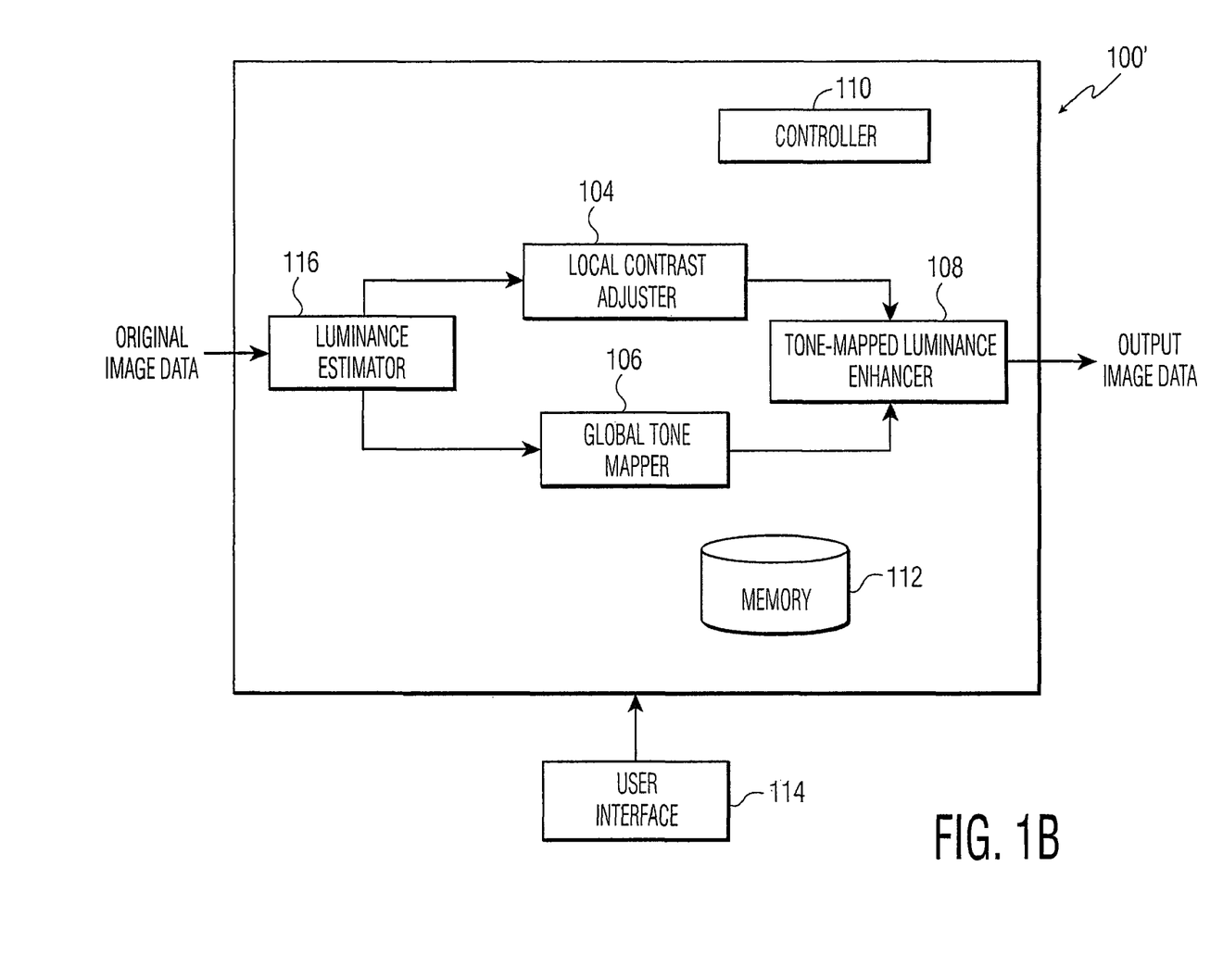

Luminance calculator 102 may be used when the pixel signal for each color channel of a pixel is known. For Bayer image data, however, there is only one color channel per pixel. For example, see Bayer image data 500 shown in FIG. 5. Accordingly, to determine the luminance value L, the pixel signals for the missing color channels of a pixel may be estimated. Referring to FIG. 1B, an LC-GTM system 100' may be used for Bayer image data. LC-GTM system 100' is the same as LC-GTM system 100 (FIG. 1A) except that LC-GTM system 100' includes a luminance estimator 116, instead of luminance calculator 102 (FIG. 1A). Luminance estimator 116 estimates the pixel signals of the respective missing color channels for each pixel. As one example, bilinear interpolation of pixel signals neighboring the pixel at location (x,y) may be used to estimate the pixel signals. It is understood that bilinear interpolation is one example of estimating pixel signals and that any suitable method for estimating the missing pixel signals for pixel(x,y) may be used. The estimated pixel signals for pixel(x,y) are used to form an estimated luminance value for pixel(x,y). An example of luminance estimation for Bayer image data is described in an example further below.

Local contrast adjuster 104 receives luminance values from luminance calculator 102 (or estimated luminance values from luminance estimator 116 (FIG. 1B)), as well as the pixel signals of the original image data and determines a local contrast (LC) adjustment for each pixel in the original image. The local contrast LC adjustment for each pixel is shown in Eq. (2) as:

$$LC(x, y) = \frac{L(x, y) + \varepsilon}{LA(x, y) + \varepsilon} \quad (2)$$

where LA represents the average luminance value of neighboring pixels in an m×n (m=number of rows and n=number of columns) window centered around pixel(x,y) and $\varepsilon$ represents a division parameter. Division parameter $\varepsilon$ is a small number greater than zero (e.g., 0.000001×$L_{AVG}$, where $L_{AVG}$ represents an average luminance value of the entire image) and may be used in Eq. (2) to prevent division by zero.

As shown in Eq. (2), the local contrast LC adjustment is based on a ratio between the pixel luminance L at location (x,y) and the average pixel luminance LA of neighboring pixels around pixel(x,y). It is understood that the local contrast LC is greater than one when pixel signals at location (x, y) have a high luminance as compared with the average luminance LA. Conversely, the local contrast LC is less than one if the pixel luminance value L is less than the average luminance value LA.

The average luminance value LA at location (x,y) may be determined based on an average red pixel signal value (RA), an average green pixel signal value (GA) and an average blue pixel signal value (BA). The average RA, GA, BA values are determined by taking respective averages of red, blue and green pixel signals within an m×n window centered about pixel(x,y). The RA, GA, and BA values may then be converted to an average luminance value LA. For example, the local average luminance value LA for sRGB space is shown in Eq. (3) as:

$$LA(x,y)=0.2125*RA(x,y)+0.7154*GA(x,y)+0.0721*BA(x,y) \quad (3)$$

It is understood that Eq. (3) represents an example average luminance conversion relationship and that any suitable average luminance conversion relationship may be used based on the type of color space. Examples of local contrast adjustment (i.e. determination of luminance values L and average luminance values LA) for RGB image data and Bayer image data are described in examples further below.

Local contrast adjuster 104 may apply a scaling factor (s) to the local contrast LC adjustment (Eq. (2)), forming a scaled local contrast ($LC_s$), as shown in Eq. (4):

$$LC_s(x,y)=(LC(x,y)-1)*s+1 \quad (4)$$

The scaling factor s may be used to attenuate or amplify the local contrast LC, for example, to produce a subjectively pleasing image appearance or to provide better content preservation and detection. It is understood that the scaling factor s may be adjusted according to the desired application. As shown in Eq. (4), when s is less than one, the scaled local contrast $LC_s$ is attenuated. Conversely, the scaled local contrast $LC_s$ is amplified when s is greater than one. It is understood that the scaling factor s may be adjusted by a user, for example, via user interface 114.

It may be desirable to limit the range of the scale factor s shown in Eq. (4). For example, if the scale factor s is too large, and the local contrast LC for pixel(x,y) is small, the scaled local contrast $LC_s$ for the pixel may translate into a negative enhanced-mapped luminance value (after combining $LC_s$ with a tone-mapped luminance in tone-mapped luminance enhancer 108). Accordingly, in one embodiment, the scaled local contrast value $LC_s$ may be limited to being greater than zero.

According to another embodiment, the scaled local contrast value $LC_S$ may be limited to one or more predetermined ranges of values. For example, for pixels with a local contrast LC close to 1, applying $LC_s$ to a globally toned-mapped luminance (i.e. with an unlimited range of $LC_s$ values) typically reproduces fine details in the compressed output image. For pixels with a local contrast LC away from 1, however, applying $LC_s$ without limiting the range of $LC_s$ values may produce pixels that are overly dark or overly bright in the compressed image. Accordingly, it may be desirable to limit the range of scaled local contrast $LC_s$ to a predetermined reduced range of values. Although in one embodiment, a range of scaled local contrast values is between 0.5 and 1.5, it is understood that any suitable predetermined range of $LC_s$ values may be selected. The range of $LC_s$ values may be adjusted, for example based on the contrast of the individual image. The range of values may be selected by a user to provide a subjectively pleasing compressed image, such as via user interface 114. Although limiting the scaled local contrast $LC_s$ to one or more predetermined ranges of values is described above, it is understood that the local contrast LC (eq. (2)) may also be similarly limited to one or more predetermined ranges of values.

According to another embodiment, more than one range of $LC_s$ values may be used, based on the luminance value L of the individual pixel. In some cases, a single range of $LC_s$ values may not be suitable for all regions of an input image. For example, a night scene with bright light sources such as street lamps may require two local contrast clamping ranges, otherwise, a dark circle may appear around the lamps and produce an unnatural looking image. In this example, a first, larger range of $LC_s$ values may be selected for dark regions of the input image and a second, smaller range of $LC_s$ values may be selected for bright regions of the image.

A range-limited LC value ($LC_s^c$) adjustment that is based on pixel luminance L is shown in Eq. (5) as:

$$LC_s^c(x, y) = \begin{cases} \text{clamp}(LC_s(x, y), R_{l1}, R_{u1}), & L(x, y) \le T \\ \text{clamp}(LC_s(x, y), R_{l2}, R_{u2}), & L(x, y) > T \end{cases} \quad (5)$$

In Eq. (5), the function clamp ($LC_s$ value, lower bound, upper bound) clamps (i.e. limits) the $LC_s$ adjustment into first and second ranges of values bounded respectively by $R_{li}$, $R_{ui}$, where i=1, 2 represents the first and second ranges of values, and T represents a luminance threshold value. As one example, the luminance threshold T may be set based on a luminance value of the input image data at a particular percentile, such as the 95$^{th}$ percentile (e.g., based on a histogram of the input image data). It is understood that the luminance threshold T and lower, upper bounds $R_{li}$, $R_{ui}$ may be adjusted by a user, for example, via user interface 114. Accordingly, luminance threshold T and lower, upper bounds $R_{li}$, $R_{ui}$ may be set by the user to produce a subjectively pleasing compressed image. Although two ranges of $LC_s$ values are illustrated in Eq. (5), Eq. (5) is not meant to be limiting. It is understood that the scaled local contrast adjustment may be restricted, based on pixel luminance L, to multiple ranges of $LC_s$ values with multiple luminance thresholds. According to another embodiment, the scaled local contrast adjustment may be restricted, based on pixel luminance L, to one range of $LC_s$ values. Although Eq. (5) includes the scaled local contrast $LC_s$, it is understood the local contrast LC (eq. (2)) may also be used in the range-limited adjustment of Eq. (5).

Although the local contrast adjustment (including the scaled local contrast and the range-limited local contrast) is described above as being determined for each pixel, it is understood that the local contrast adjustment may be determined for selected pixels of the image. For example, the local contrast adjustment may be determined for pixels having luminance values L in one or more ranges of values, such as for those pixels with very bright and very dark luminance values. When applied to each pixel, all of the pixels in the image are selected.

Global tone mapper 106 receives the luminance values L determined by luminance calculator 102 (or the estimated luminance values determined by luminance estimator 116 (FIG. 1B)) and determines a global tone-mapped luminance ($L_{TM}$) for pixels in the original image. One example of a global tone mapping technique to produce global tone-mapped luminance $L_{TM}$ is shown in Eq. (6):

$$L_{TM}(x, y) = \frac{L(x, y)}{b * G + L(x, y)} \quad (6)$$

where G represents an average luminance value for the entire input image data and b represents a brightness parameter for controlling the overall brightness of the tone-mapped image. For example, brightness parameter b may be increased to darken the tone-mapped luminance $L_{TM}$. Conversely, brightness parameter b may be decreased to brighten the tone-mapped luminance $L_{TM}$. The brightness parameter b may adjusted by a user, for example, via user interface 114.

It is understood that Eq. (6) represents one example of global tone mapping and that the global toned-mapped luminance $L_{TM}$ may be determined by any suitable global mapping technique. Although the present invention is described with respect to global tone mapping, it is contemplated that tone mapper 106 may also use any suitable local tone mapping technique to generate the tone-mapped luminance $L_{TM}$. Examples of global and local tone-mapping techniques are described in U.S. Pat. No. 7,023,580 to Zhang et al. Although Eq. (6) illustrates a tone-mapped luminance, it is understood that tone-mapping may be applied to any color component such that, in general, a global tone-mapped value may be obtained.

Although the global or local tone-mapped luminance is described above as being determined for each pixel, it is understood that the global tone-mapped luminance may be determined for selected pixels of the image. For example, global tone-mapped luminance may be determined for pixels having luminance values L in one or more ranges of values, such as for those pixels with very bright and very dark luminance values. When applied to each pixel, all of the pixels in the image are selected.

Tone-mapped luminance enhancer 108 receives the local contrast adjusted luminance (i.e., LC, $LC_s$ or $LC_s^C$) from local contrast adjuster 104 and the global tone-mapped luminance $L_{TM}$ from global tone mapper 106. Tone-mapped luminance enhancer 108 combines the tone-mapped luminance $L_{TM}$ with the local contrast adjusted luminance to produce an enhanced-tone mapped luminance ($L_{EM}$) for each pixel and form the output image data, as shown in Eq. (7):

$$L_{EM}(x,y)=(L_{TM}(x,y)+P)*LC_s^c(x,y)-P \quad (7)$$

where P represents a pedestal value. The pedestal value P may be used, for example, to enhance details in very dark regions of the output image data. In some cases, however, pixels in very dark regions may have relatively high noise values. In these cases, including a pedestal value may not only bring out the image detail but may also boost the noise values in the dark regions. Accordingly, in these cases, the pedestal value may be set to zero. The pedestal value P may be adjusted by a user via user interface 114. Although Eq. (7) includes the range-limited local contrast $LC_s^c$, it is understood that any of the local contrast adjustments described above (e.g. LC and $LC_s$) may be used to determine the enhanced tone-mapped luminance $L_{EM}$. Although Eq. (7) illustrates an enhanced tone-mapped luminance, it is understood that a general enhanced tone-mapped value may be obtained for each pixel, by replacing the global tone-mapped luminance in Eq. (7) with a global tone-mapped value that is applied to any color component.

In general, the enhanced-tone mapped luminance $L_{EM}$ is produced by multiplying the tone-mapped luminance $L_{TM}$ with the local contrast adjustment. As discussed above, tone mapping may reduce details in the compressed image that were originally present in the HDR original image data. Accordingly, the local contrast adjustment may be used to restore some of the local contrast into the compressed image. By using the ratio between luminance L and local average luminance LA for each pixel, the local contrast adjustment may be used to enhance edges in the image and to restore fine details in the compressed image that may otherwise be lost in the reduced dynamic range.

Memory 112 may be used to store the output image, and variables such as brightness parameter b, pedestal value P, luminance threshold T, boundaries $R_{li}$, $R_{ui}$ and scaling factor s. Memory 112 may be an internal memory or an external memory on a remote device.

Figure 2:
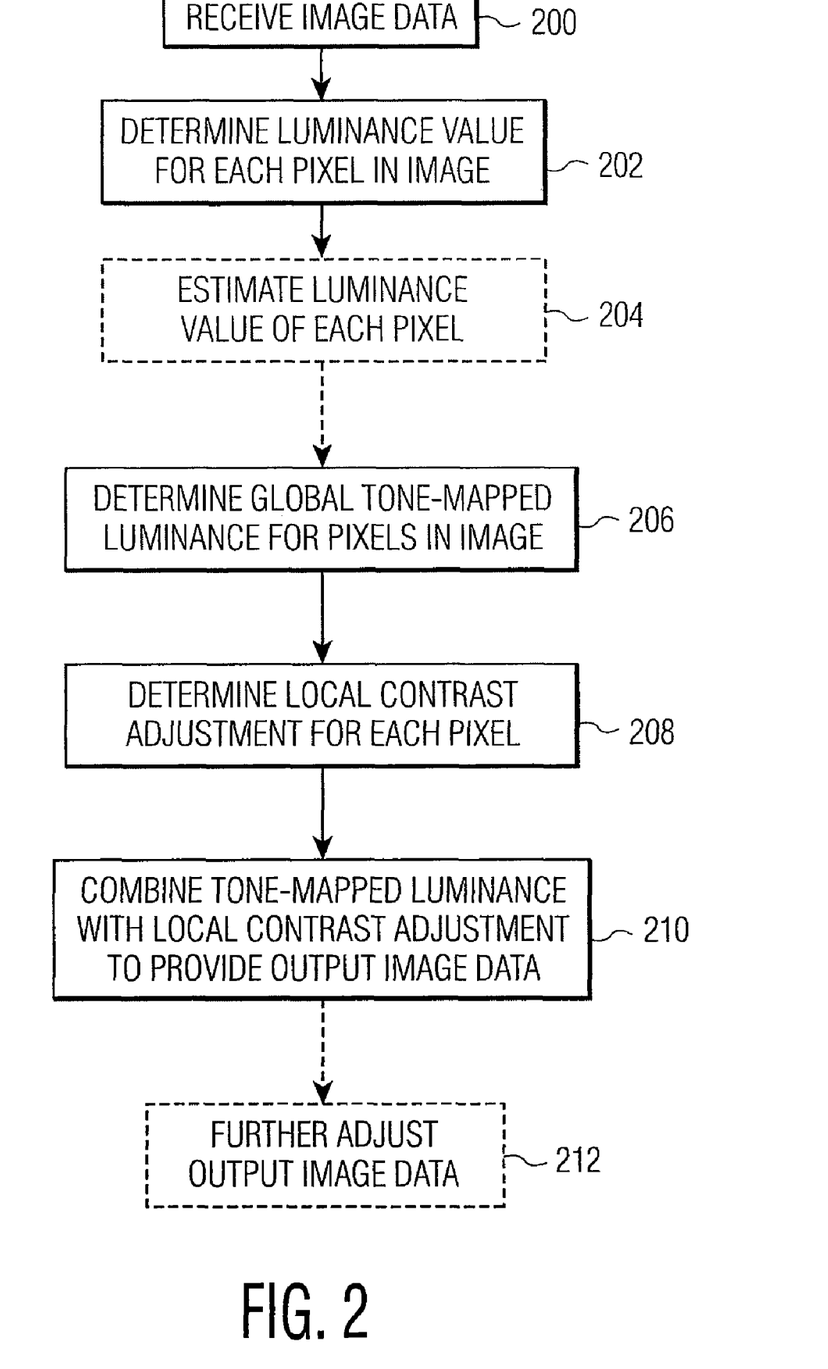
FIG. 2 is a flow chart illustrating a method for compressing an image using local contrast enhancement according to an example embodiment of the invention.

Referring to FIG. 2, a flow chart for compressing an image using local contrast enhancement is shown. The steps illustrated in FIG. 2 represent an example embodiment of the present invention. It is understood that certain steps may be performed in an order different from what is shown. It is also understood that certain steps may be eliminated.

At step 200, input image data is received, for example by luminance calculator 102 (FIG. 1A) or luminance estimator 116 (FIG. 1B). At step 202, a luminance value L is determined for each pixel in the image, for example, by luminance calculator 102 (FIG. 1A). At alternative step 204, the luminance value L of each pixel may be estimated, for example, by luminance estimator 116 (FIG. 1B).

At step 206, the global tone-mapped luminance $L_{TM}$ is determined for pixels in the image, for example, by global tone mapper 106 (FIG. 1A). At step 208, a local contrast adjustment (such as LC, $LC_s$ or $LC_s^c$) is determined for each pixel in the image, for example by local contrast adjuster 104 (FIG. 1A).

At step 210, the tone-mapped luminance is combined with the local contrast adjustment to provide enhanced-tone mapped luminance $L_{EM}$ as output image data, for example, by tone-mapped luminance enhancer 108 (FIG. 1A).

At step 212, the output image data may be further adjusted, for example, by a user via user interface 114 (FIG. 1A). For example, a user may adjust one or more of the scale factor s (Eq. (4)), the luminance threshold T (Eq. (5)), the boundaries $R_{li}$, $R_{ui}$ of one or more ranges of $LC_s$ values (Eq. (5)), the pedestal value P (Eq. (7)) and the brightness value b (Eq. (6)). Based on the parameters adjusted by the user, one or more of steps 206-210 may be repeated.

Figure 3:
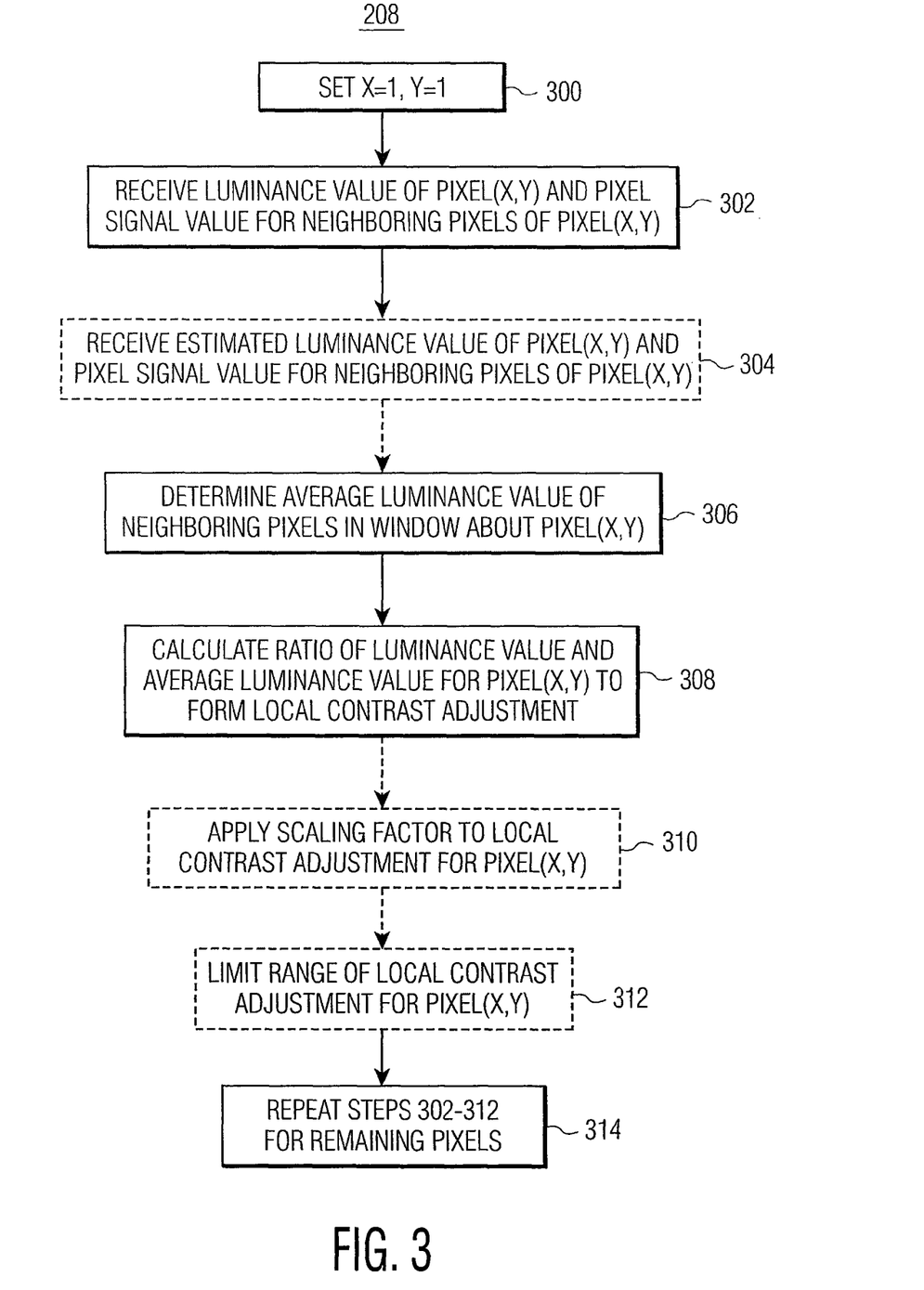
FIG. 3 is a flow chart illustrating a method for determining local contrast adjustment according to an example embodiment of the invention.

Referring to FIG. 3, a flow chart illustrating a method for determining local contrast adjustment, step 208 (FIG. 2), is shown. The steps illustrated in FIG. 3 represent an example embodiment of the present invention. It is understood that certain steps may be performed in an order different from what is shown. It is also understood that certain steps may be eliminated.

At step 300, pixel indices x and y are initialized to one. At step 302, the luminance value and pixel signal values neighboring the pixel at location (x, y) are received, for example, by local contrast adjuster 104 from luminance calculator 102 (FIG. 1A). At alternative step 304, the estimated luminance value and pixel signal values neighboring the pixel at location (x, y) are received, for example, from luminance estimator 116 (FIG. 1B).

At step 306, an average luminance value LA of neighboring pixels in an m×n window centered about pixel(x, y) is determined, as described above. At step 308, a ratio of luminance value L and average luminance value LA for pixel(x, y) is calculated to form the local contrast LC adjustment for pixel(x,y), for example, using Eq. (2).

At step 310, a scaling factor s is applied to the local contrast adjustment determined at step 308 to form scaled local contrast $LC_s$, for example, using Eq. (4). At step 312, the range of the scaled local contrast adjustment is limited to form range-limited local contrast $LC_s^c$, for example, in one or more ranges of $LC_s$ values, for example, using Eq. (5). At step 314, steps 302-312 are repeated for the remaining pixels of the original image data.

Figure 4A:
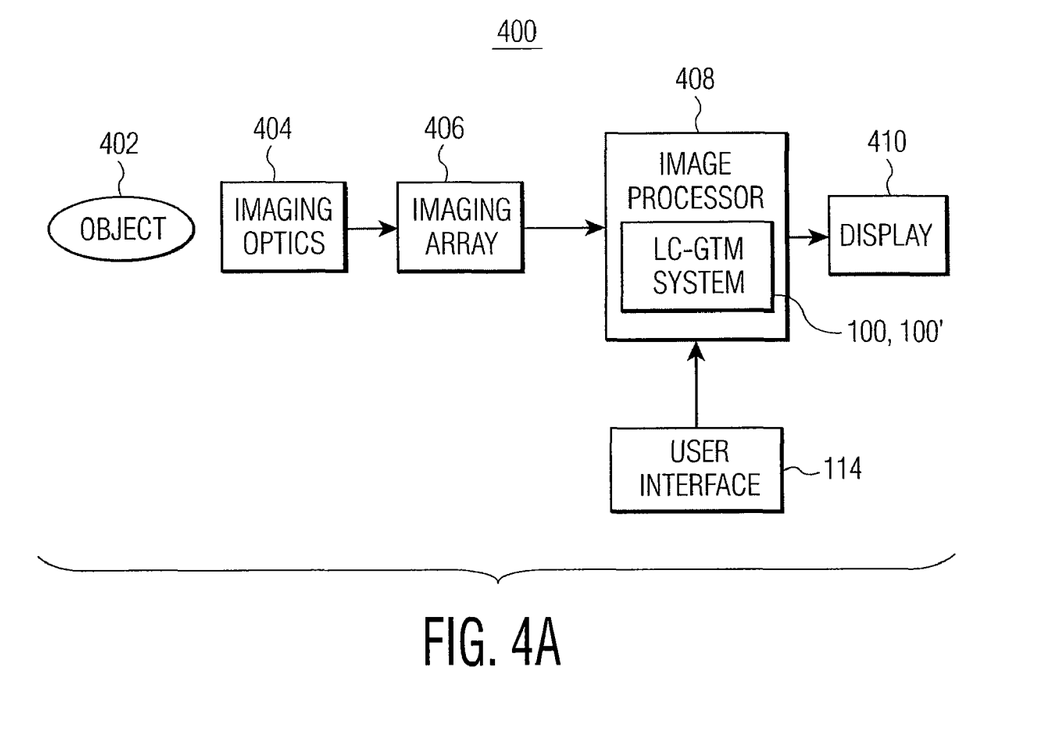
FIGS. 4A and 4B are block diagrams of imaging systems including the LC-GTM systems shown in FIGS. 1A and 1B, according to an example embodiment of the invention.

FIG. 4A is a block diagram of an example imaging system 400 that includes output image data determined by LC-GTM system 100 (FIG. 1A) or by LC-GTM system 100' (FIG. 1B). Imaging system 400 includes imaging optics 404, imaging array 406, image processor 408, display 410 and user interface 114. Imaging optics 404 include an imaging lens (not shown) and may include other optical elements that project an optical image of object 402 onto imaging array 406.

Imaging array 406 has sensing pixels arranged as an array of pixels formed on a semiconductor substrate. Each pixel has a photosensitive area, e.g., a photogate or photodiode, to convert received photons into a pixel signal and a non-photosensitive area which has pixel circuit elements to process the pixel signal. The pixel signals from the sensing pixels constitute an electronic image of the received optical image. Imaging array 406 may include CMOS devices.

Imaging array 406 may also include an array of color filters (not shown) corresponding to the pixels in the pixel array. The array of color filters may block incoming light of a particular color(s) from reaching the photosensitive portion of the corresponding pixels. The array of color filters may be monochromatic or may include color filters for passing light of different colors to corresponding pixels of imaging array 406.

Figure 4B:
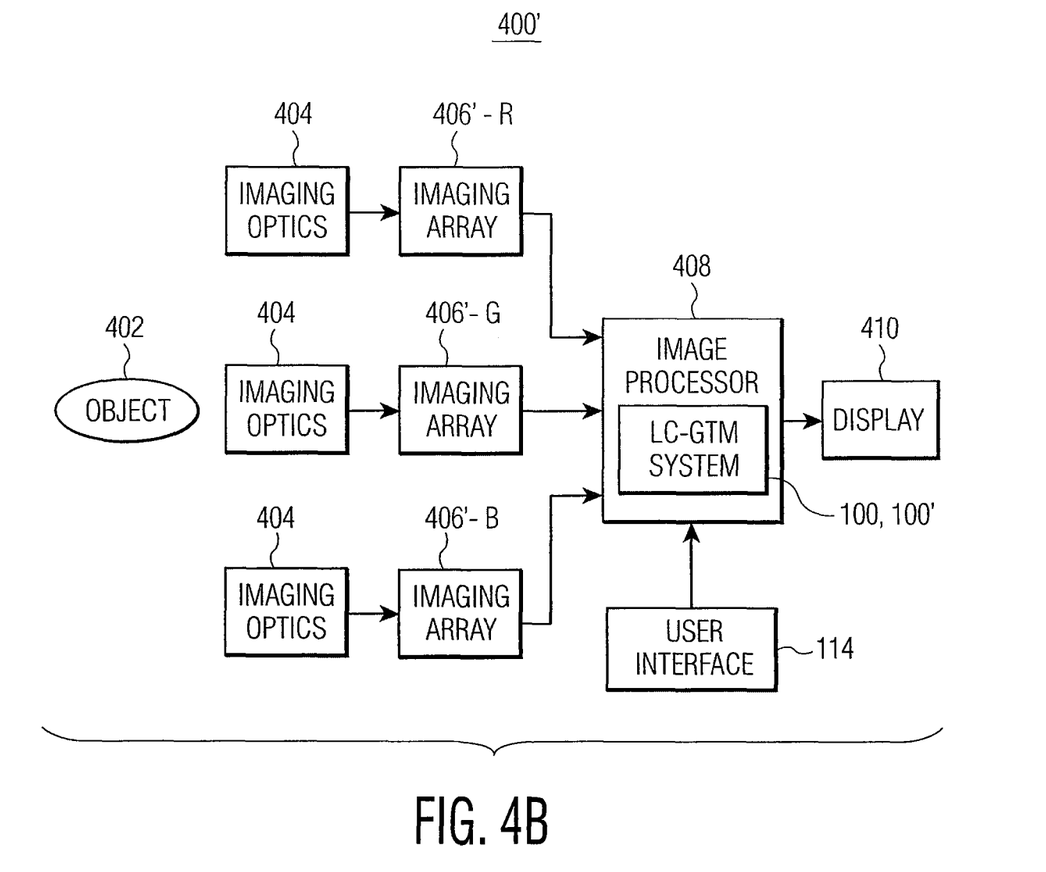

In FIG. 4A, imaging array 406 may represent a single imaging array where the color filters are arranged in a Bayer pattern, to produce Bayer image data. Referring to FIG. 4B, an imaging system 400' may include multiple imaging arrays 406'. Imaging arrays 406' represent monochromatic imaging arrays (i.e. with monochromatic color filters) and include red imaging array 406'-R, green imaging array 406'-G and blue imaging array 406'-B. Each imaging array 406' includes respective imaging optics 404. Imaging system 400' is similar to imaging system 400 (FIG. 4A) except that imaging system 400' includes monochromatic imaging arrays 406', which may be used to produce RGB image data.

Referring back to FIG. 4A, image processor 408 is coupled to the sensing pixels to read out the pixel signals and may read out the pixel signals into another circuit for further processing. Image processor 408 is also coupled to display 410 to display the electronic image, and/or to a memory device (not shown) to buffer the electronic image. Certain signal processing capabilities may be incorporated in image processor 408. Furthermore, image processor 408 may be integrated with imaging array 406 on the same substrate. Image processor 408 includes LC-GTM system 100 or LC-GTM system 100' which compresses the electronic image received from imaging array 406 and also locally enhances the compressed image, as described above with respect to FIG. 1A.

The present invention is illustrated by reference to two examples. The examples are included to more clearly demonstrate the overall nature of the invention. These examples are not restrictive of the invention.

Referring back to FIG. 4B, an example of locally enhanced tone-mapped pixel value ($I_{EM}$) for RGB image data is described. In this example, an sRGB space is used. As shown in FIG. 4B, imaging arrays 406' are monochromatic and include a separate imaging array for each color channel (i.e. red, green and blue). Accordingly, a pixel at location (x,y) includes a pixel signal for each of the three color channels from respective imaging arrays 406'-R, 406'-G and 406'-B. In this example, the pixel signal received from the three imaging arrays 406' may be represented as I(x,y,k), where k represents the color channel and k=1,2,3 corresponds to a red, green or blue pixel signal value of respective imaging arrays 406'-R, 406'-G and 406'-B.

The global tone-mapped pixel value ($I_{TM}$) may be represented by Eq. (8) as:

$$I_{TM}(x, y, k) = \frac{I(x, y, k)}{b * G + L(x, y)} \quad (8)$$

where b represents the brightness parameter and G represents the average luminance value for the entire input image data, as described above with respect to Eq. (6). Eq. (8) is similar to Eq. (6) except that the global tone-mapped pixel value ($I_{TM}$) in Eq. (8) further relates to the color channel k for pixel(x,y). The luminance L may be determined, for example, using Eq. (1), with the respective red (R), green (G) and blue (B) pixel signal values substituted for R(x,y), G(x,y) and B(x,y).

The local contrast adjustment LC may be determined based on Eq. (2). The luminance value L(x,y) may be calculated as described above using Eq. (1). The average red pixel signal (RA) is determined by calculating an average of red pixel signal values within a 3×3 window of pixels centered on pixel(x,y) of red imaging array 406'-R. The average green pixel signal value (GA) and the average blue pixel signal value (BA) may be similarly determined for respective pixels of green imaging array 406'-G and blue imaging array 406'-B. Once RA, GA and BA are determined, The average luminance value LA(x,y) is then determined from Eq. (3) using the determined RA, GA and BA values.

Once L(x,y) and LA(x,y) are calculated, the local contrast adjustment LC may be determined from Eq. (2). The local contrast LC may also be scaled (Eq. (4)) or range-limited (Eq. (5)), as described above.

The enhanced tone-mapped pixel value $I_{EM}$ may be determined as shown in Eq. (9):

$$I_{EM}(x,y,k)=(I_{TM}(x,y,k)+P)*LC_s^c(x,y)-P, k=1, 2, 3 \quad (9)$$

where P represents the pedestal value, as described above with respect to Eq. (7). Eq. (9) is similar to Eq. (7) except that the enhanced tone-mapped pixel value in Eq. (9) further relates to the color channel k for pixel(x,y). Accordingly, Eq. (9) provides an enhanced tone-mapped pixel value for each color channel. Although Eq. (9) includes the range-limited local contrast $LC_s^c$, it is understood that any of the local contrast adjustments described above (e.g. LC and $LC_s$) may be used to determine the enhanced tone-mapped pixel value $I_{EM}$.

Figure 5:
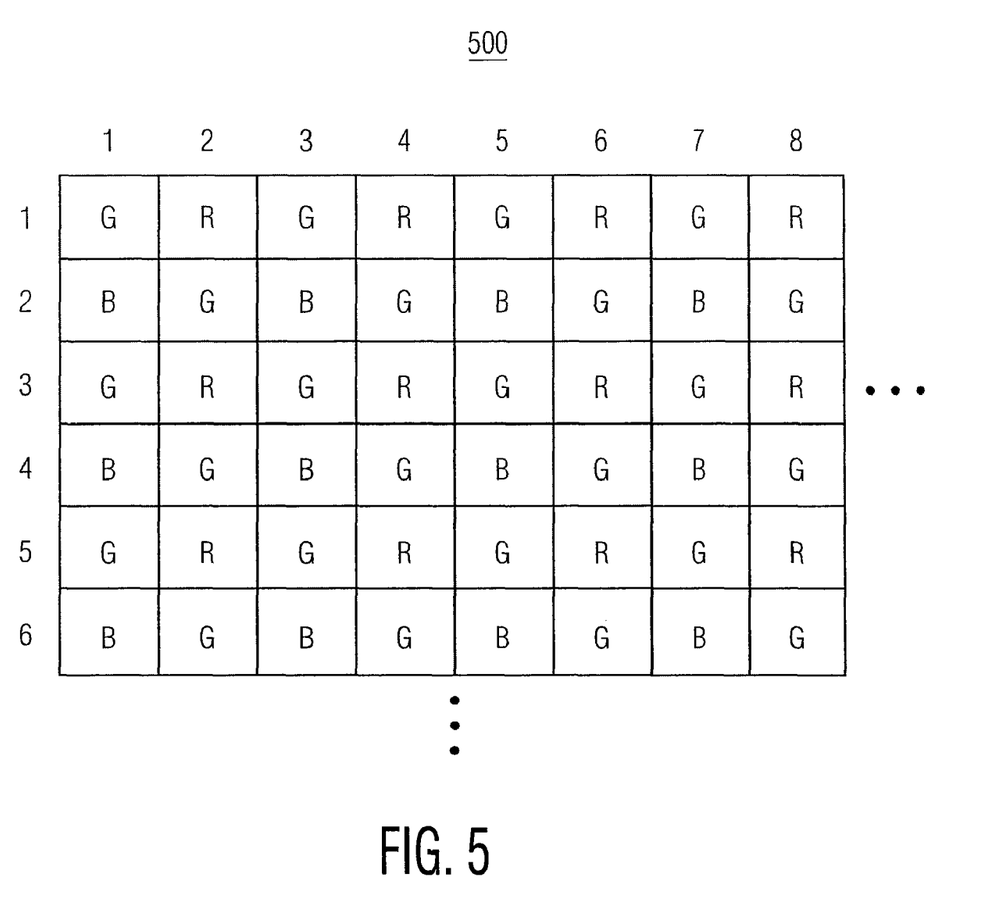
FIG. 5 is a diagram of a portion of a Bayer image data illustrating an example of estimating luminance and average luminance values for a pixel, according to an embodiment of the invention.

Referring back to FIG. 4A, an example of locally enhanced tone-mapped pixel value ($I_{EM}$) for Bayer image data is described. In this example, the pixel signal received from imaging array 406 is represented as I(x,y). In addition, an sRGB space is used. As shown in FIG. 4A, there is only one imaging array 406, and thus one color channel per pixel. FIG. 5 illustrates an example of a portion of Bayer image data 500. As shown in FIG. 5, green pixel G33 includes a green pixel signal (G) but is missing red pixel signal (R) and blue pixel signal (B). Similarly, red pixel R34 includes red pixel signal (R) but is missing green pixel signal (G) and blue pixel signal (B).

Accordingly, in order to determine the luminance value L for a pixel at location (x,y), the pixel signals of the missing color channels may be estimated from the neighboring pixel locations. Once the missing pixel signals are estimated, the luminance value L(x,y) (Eq. (1)) may be calculated. In this example, a bilinear interpolation of pixel signals is used to obtain the missing color channels.

In the examples shown below, a bilinear interpolation of missing pixel signals for a) green pixel G33, b) red pixel R34, c) blue pixel B43 and d) green pixel G44 are provided. As can be seen in these examples, only the nearest neighbor pixel signals are used in the interpolation.

(a) For green pixel G33, the missing red and blue values are:

$R33=(R32+R34)/2$ $B33=(B23+B43)/2$ (b) For red pixel R34, the missing green and blue values are:

$G34=(G33+G35+G24+G44)/4$ $B34=(B23+B25+B43+B45)/4$ (c) For blue pixel B43, the missing red and green values are:

$R43=(R32+R34+R52+R54)/4$ $G43=(G42+G44+G33+G53)/4$ (d) For green pixel G44, the missing red and blue values are:

$R44=(R34+R54)/2$ $B44=(B43+B45)/2$

After the pixel signals of the missing color channels are estimated, the luminance value L(x,y) may be calculated as described above using Eq. (1). For example, the luminance value L(3,3) (corresponding to green pixel G33) may be determined as:

$L(3,3)=0.2125*R33+0.7154*G33+0.0721*B33$

Similar luminance values may be determined for pixels R34, B43 and G44.

Once the luminance value L is estimated, the local contrast adjustment LC may be determined using Eq. (2). As part of the local contrast adjustment, the ratio between luminance value L and average luminance value LA is calculated. To obtain the average luminance value LA(x,y), pixel signals that are within a 5×3 window centered on the pixel at location (x,y) are averaged. In the examples shown below, the average pixel signals for a) green pixel G33, b) red pixel R34, c) blue pixel B43 and d) green pixel G44 are provided. As can be seen in these examples below, because the imaging array 406 includes color filters arranged in a Bayer pattern, the number of red, blue and green pixel signals used to form the average is not the same across different pixel locations.

(a) For green pixel G33, the local average R, G, B values are:

$RA33=(R32+R34)/2$ $GA33=(G22+G24+G31+G33+G35+G42+G44)/7$ $BA33=(B21+B23+B25+B41+B43+B45)/6$ (b) For red pixel R34, the local average R, G, B values are:

$RA34=(R32+R34+R36)/3$ $GA34=(G22+G24+G26+G33+G35+G42+G44+G46)/8$ $BA34=(B23+B25+B43+B45)/4$ (c) For blue pixel B43, the local average R, G, B values are:

$RA43=(R32+R34+R52+R54)/4$ $GA43=(G31+G33+G35+G42+G44+G51+G53+G55)/8$ $BA43=(B41+B43+B45)/3$ (d) For green pixel G44, the local average R, G, B values are:

$RA44=(R32+R34+R36+R52+R54+R56)/6$ $GA44=(G33+G35+G42+G44+G46+G53+G55)/7$ $BA44=(B43+B45)/2$

Once RA, GA and BA are determined, the average luminance value LA(x,y), may be determined using Eq. (3). For example, the average luminance value LA(3,3) (corresponding to green pixel G33) may be determined as:

$LA(3,3)=0.2125*RA33+0.7154*GA33+0.0721*BA33$

Similar average luminance values LA may be determined for pixels R34, B43 and G44.

Once L(x,y) and LA(x,y) are calculated, the local contrast adjustment LC may be determined using Eq. (2). The local contrast LC may also be scaled (Eq. (4)) or range-limited (Eq. (5)), as described above.

The global tone-mapped pixel value ($I_{TM}$) may be represented by Eq. (10) as:

$$I_{TM}(x, y) = \frac{I(x, y)}{b*G + L(x, y)} \quad (10)$$

where b represents the brightness parameter and G represents the average luminance value for the entire input image data, as described above with respect to Eq. (6). Eq. (10) is similar to Eq. (6) except that the global tone-mapped pixel value $I_{TM}$ in Eq. (10) includes an estimated luminance.

The enhanced tone-mapped pixel value $I_{EM}$ may be determined as shown in Eq. (11):

$I_{EM}(x,y)=(I_{TM}(x,y)+P)*LC_s^c(x,y)-P$ (11)

where P represents the pedestal value, as described above with respect to Eq. (7). Eq. (11) is similar to Eq. (7) except that the enhanced tone-mapped pixel value in Eq. (11) further relates to the estimated luminance. Although Eq. (11)

includes the range-limited local contrast $LC_s^c$, it is understood that any of the local contrast adjustments described above (e.g. LC and $LC_s$) may be used to determine the enhanced tone-mapped pixel value $I_{EM}$.

To simplify the estimation of luminance value L and calculation of average luminance value LA, the green pixel signal (G) may be used to approximate the luminance value L. Accordingly, only the green pixel signal may be estimated for red (R) and blue (B) pixels. For the average luminance value LA, only the average green pixel signal (GA) may be determined. The remainder of the calculations for local contrast $LC_s^c$, global tone-mapped pixel value $I_{TM}$ and enhanced tone-mapped pixel value $I_{EM}$ are as described above. In this example, the estimation of the luminance and average luminance values may be greatly reduced.

Although the invention has been described in terms of systems and methods for forming compressed images with local contrast enhancement, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in tangible computer readable media for execution by the computer.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for enhancing an image, the method comprising:
   determining respective local contrast values for selected pixels of the image by, for each selected pixel, generating a ratio between a respective luminance value of the pixel and an average luminance value of neighboring pixels to obtain the local contrast value;
   determining respective tone-mapped values for further selected pixels in the image based on a global luminance value representing the image;
   combining the local contrast values and the tone-mapped values, respectively, for the corresponding pixels in the image to produce the enhanced image, wherein the determined local contrast values are limited to one of at least two different predetermined ranges of values based on the luminance value of the respective pixel, and wherein each of the at least two different predetermined ranges of values has an upper bound and a lower bound.

2. The method according to claim 1, wherein the determining of the tone-mapped values includes:
   modifying, for each further selected pixel, the luminance value of the respective pixel by the global luminance value; and
   determining, for each further selected pixel, a ratio between a pixel value of the respective pixel and the respective modified luminance value.

3. The method according to claim 1, wherein the determining of the local contrast values includes, for each respective selected pixel in the image:
   receiving a plurality of pixel signals for a window of local pixels neighboring the respective pixel, each of the pixel signals including at least one of a first, second or third color channel;
   determining first, second and third average pixel values for each of the corresponding first, second and third color channels based on the plurality of pixel signals; and
   calculating the average luminance value from the first, second and third average pixel values.

4. The method according to claim 1, wherein the determining of the local contrast values includes:
   scaling the selected local contrast values with a scale factor, and wherein the combining of the local contrast values and the tone-mapped values includes combining the selected scaled local contrast values and the respective tone-mapped values.

5. The method according to claim 1, wherein the determining of the respective local contrast values for the selected pixels includes determining the respective local contrast values for each of the pixels of the image, wherein all pixels in the image are the selected pixels.

6. The method according to claim 1, wherein the determining of the respective tone-mapped values for the further selected pixels includes determining the respective tone-mapped values for each of the pixels of the image, wherein all pixels in the image are the further selected pixels.

7. An imager comprising:
   an imaging array, including a plurality of pixels, that captures an image;
   an image processor including:
      a local contrast adjuster that, for selected pixels of the captured image, generates a ratio between a respective luminance value and an average luminance value of neighboring pixels to form respective local contrast adjustment values for the selected pixels of the captured image, wherein the local contrast adjustment values are applied to respective globally tone-mapped values of further selected pixels of the captured image to form respective enhanced tone-mapped values, and the local contrast adjustment values are limited to one of at least two different predetermined ranges of values based on the luminance value of the respective pixel, and wherein each of the at least two different predetermined ranges of values has an upper bound and a lower bound.

8. The imager according to claim 7, further comprising a luminance calculator that receives, for each pixel, a respective pixel signal from the imaging array and converts the pixel signal to the corresponding luminance value, wherein the pixel signal includes first, second and third color channels.

9. The imager according to claim 7, further comprising a luminance estimator that a) receives, for each pixel, a respective pixel signal from the imaging array, the pixel signal including one of a first, second or third color channel, b) estimates the remaining color channels from neighboring pixels to form an estimated pixel signal including each of the color channels and c) converts the estimated pixel signal to the corresponding luminance value.

10. The imager according to claim 7, wherein the imaging array includes first, second and third monochromatic imaging arrays that provide pixel signals corresponding respectively to first, second and third color channels.

11. The imager according to claim 7, wherein the pixels of the imaging array are arranged in a Bayer pattern and the imaging array provides pixel signals corresponding respectively to first, second and third color channels.

12. The imager according to claim 7, further comprising a tone mapper that receives pixel values for the corresponding further selected pixels and determines the globally tone-mapped values based on a global luminance value representing the image.

13. The imager according to claim 12, further comprising a luminance enhancer that receives the globally tone-mapped values from the tone mapper and modifies the tone-mapped values by the respective local contrast adjustment values received from the local contrast adjuster.

14. The imager according to claim 12, wherein the tone mapper determines the globally tone-mapped values for each pixel of the captured image.

15. An imaging system comprising:
an imaging array, including a plurality of pixels, that captures an image;
an image processor comprising:
a local contrast-tone mapping (LC-TM) system that a) generates a dynamic range-compressed image of the captured image by applying global tone-mapping to the captured image and b) modifies the compressed image by a local contrast adjustment to form an output image, the local contrast adjustment being based on, for selected pixels of the captured image, a ratio between a respective luminance value and an average luminance value of respective neighboring pixels, the local contrast adjustment being limited to one of at least two different predetermined ranges of values based on the luminance value of the respective pixel, wherein each of the at least two different predetermined ranges of values has an upper bound and a lower bound;
a display device that displays the output image; and
a user interface coupled to the LC-TM system and that is used to adjust an adjustment parameter of the LC-TM system.

16. The imaging system according to claim 15, further comprising a controller that modifies the adjustment parameter of the LC-TM system responsive to the user interface.

17. The imaging system according to claim 15, wherein the adjustment parameter includes at least one of a brightness parameter, a pedestal parameter, a scaling parameter, a luminance threshold or a range of local contrast values.

18. The imaging system according to claim 15, wherein the local contrast adjustment includes a scaling parameter and the local contrast adjustment is scaled by the scaling parameter responsive to the user interface.

19. The imaging system according to claim 15, wherein the local contrast adjustment is determined for each pixel of the captured image.

20. A method for processing Bayer pixel signals corresponding to pixels of an image, each of the Bayer pixel signals including one of a red color channel, a blue color channel or a green color channel, the method comprising, for each selected pixel:
estimating a luminance value of the respective selected pixel based on the respective Bayer pixel signal and, optionally, on neighboring Bayer pixel signals;
determining a respective local contrast value for each of the selected pixels based on a ratio between the corresponding estimated luminance value and an average luminance value of local neighboring pixels; and
modifying a corresponding global tone-mapped value by the respective local contrast value, wherein the determined local contrast values are limited to one of at least two different predetermined ranges of values based on the luminance value of the respective pixel, and wherein each of the at least two different predetermined ranges of values has an upper bound and a lower bound.

21. The method according to claim 20, wherein the determining of the local contrast value includes:
receiving a plurality of Bayer pixel signals for a window of local pixels neighboring the respective selected pixel;
determining first, second and third average Bayer pixel signals for the corresponding red, blue and green color channels based on the plurality of pixel signals;
converting the first, second and third average Bayer pixel signals into the average luminance value.

22. The method according to claim 20, the estimating of the luminance value including:
estimating the remaining color channels from the neighboring pixels; and
converting the respective Bayer pixel signal to the luminance value using the estimated color channels and the respective Bayer pixel signal to form the estimated luminance value.

23. The method according to claim 20, wherein the luminance value is estimated using at least one Bayer pixel signal corresponding to the green color channel.

24. The method according to claim 20, wherein the average luminance value is determined using an average of neighboring Bayer pixel signals corresponding to the green color channel.

25. The method according to claim 20, wherein the determining of the respective local contrast value for each of the selected pixels includes determining the respective local contrast value for each pixel of the image.

* * * * *